(12) United States Patent  
Lamboley et al.

(10) Patent No.: US 12,106,442 B2  
(45) Date of Patent: Oct. 1, 2024

(54) COMPUTER-IMPLEMENTED METHOD FOR ASSISTING A POSITIONING OF A 3D OBJECT IN A 3D SCENE

(71) Applicant: DASSAULT SYSTEMES, Velizy Villacoublay (FR)

(72) Inventors: Jeremy Lamboley, Velizy Villacoublay (FR); Christophe Delfino, Sophia Antipolis (FR); Romain Perron, Velizy Villacoublay (FR); Christophe Belot, Velizy Villacoublay (FR); Florent Coic, Velizy Villacoublay (FR)

(73) Assignee: DASSAULT SYSTEMES, Velizy Villacoublay (FR)

( * ) Notice: Subject to any disclaimer, the term of this patent is extended or adjusted under 35 U.S.C. 154(b) by 191 days.

(21) Appl. No.: 17/023,212

(22) Filed: Sep. 16, 2020

(65) Prior Publication Data

US 2021/0090351 A1 Mar. 25, 2021

(30) Foreign Application Priority Data

Sep. 23, 2019 (EP) .................................... 19306172

(51) Int. Cl.
*G06T 19/20* (2011.01)
*G06T 15/08* (2011.01)

(52) U.S. Cl.
CPC .............. *G06T 19/20* (2013.01); *G06T 15/08* (2013.01); *G06T 2219/2004* (2013.01); *G06T 2219/2016* (2013.01)

(58) Field of Classification Search
None
See application file for complete search history.

(56) References Cited

U.S. PATENT DOCUMENTS

| 6,426,745 | B1 * | 7/2002 | Isaacs | G06F 3/04845 345/619 |
| 2013/0065682 | A1 * | 3/2013 | Izuno | A63F 13/5252 463/31 |
| 2013/0100115 | A1 * | 4/2013 | Mlyniec | G06F 3/0346 345/157 |
| 2014/0229871 | A1 * | 8/2014 | Tai | G06F 3/04845 715/765 |

(Continued)

OTHER PUBLICATIONS

Oh et al., "Image-Based Modeling and Photo Editing", Aug. 2001, Proceedings of the 28th annual conference on Computer graphics and interactive techniques, pp. 433-442 (Year: 2001).*

(Continued)

*Primary Examiner* — Kent W Chang
*Assistant Examiner* — Jonathan M Cofino
(74) *Attorney, Agent, or Firm* — Oblon, McClelland, Maier & Neustadt, L.L.P.

(57) ABSTRACT

A positioning of a digitally modeled 3D object is assisted in a particular method which also includes obtaining a first digitally modeled 3D object having a 3D position in a 3D scene, rendering a projection of said first digitally modeled 3D object on a screen according to a first axis and a first viewpoint, and while modifying, upon user action, the 3D position of the first digitally modeled 3D object along the first axis, automatically scaling the first 3D object in order to keep constant the projection of the moved object on the screen.

15 Claims, 3 Drawing Sheets

(56) References Cited

U.S. PATENT DOCUMENTS

| | | | | |
|---|---|---|---|---|
| 2015/0227285 | A1* | 8/2015 | Lee | G06F 3/0488 |
| | | | | 715/765 |
| 2016/0180485 | A1* | 6/2016 | Avila | G06K 9/6201 |
| | | | | 382/154 |
| 2019/0342632 | A1* | 11/2019 | DeFaria | G06T 19/006 |
| 2021/0192793 | A1* | 6/2021 | Engelland-Gay | G06T 9/001 |

OTHER PUBLICATIONS

Extended Search Report issued Feb. 12, 2020 in Europe Patent Application No. 19306172.8-1230, 12 pgs.

Jarkko Polvi, et al.; "SlidAR: A 3D Positioning Method for SLAM-Based Handheld Augmented Reality"; Computers and Graphics, Elsevier, GB, vol. 55, Nov. 21, 2015; XP029444418; ISSN: 0097-8493; 12 pgs.

Anthony Martinet, et al.; "The Design and Evaluation of 3D Positioning Techniques for Multi-touch Displays"; 3D User Interfaces (3DUI); 2010 IEEE Symposium On, IEEE, Piscataway, NJ, USA; Mar. 20, 2010; XP031656039; ISBN: 978-1-4244-6846-1; 4 pgs.

Sudipta N. Sinha, et al.; "Interactive 3D Architectural Modeling from Unordered Photo Collections"; ACM Transactions on Graphics; vol. 27, No. 5; Dec. 1, 2008; XP055008808; ISSN: 0730-0301; 10 pgs.

Byong Mok Oh, et al.; "Image-Based Modeling and Photo Editing"; Jan. 1, 2002; XP055401778; Retrieved From the Internet: URL:http://groups.csail.mit.edu/graphics/ibedit/ibedit_s2001_cameraReady.pdf; [retrieved on Jan. 1, 2019]; 10 pgs.

Junwei Sun, et al.; "SHIFT-Sliding and DEPTH-Pop for 3D Positioning"; Proceedings of the 2016 Symposium on Spatial User Interaction, SUI '16; Oct. 15, 2016; XP055665286; New York, New York, USA; ISBN: 978-1-4503-4068-7; 10 pgs.

Ji-Young OH, et al.; "Moving Objects with 2D Input Devices in CAD Systems and Desktop Virtual Environments"; Graphics Interface 2005: Proceedings; Victoria, British Columbia; May 9-11, 2005; Canadian Information Processing Society, May 7, 2005; XP058177129; ISSN: 0713-5424; ISBN: 978-1-56881-337-0; 8 pgs.

Anonymous "Animation—How to keep the object size constant while it is moving?", Blender Stack Exchange, Apr. 24, 2018, XP93046845, pp. 1-4, (retrieved on May 15, 2023) URL:https://blender.stackexchange.com/questions/106968/how-to-keep-the-object-size-constant-while-it-is-moving.

* cited by examiner

COMPUTER-IMPLEMENTED METHOD FOR ASSISTING A POSITIONING OF A 3D OBJECT IN A 3D SCENE

CROSS-REFERENCE TO RELATED APPLICATIONS

This application claims priority under 35 U.S.C. § 119 or 365 to European Application No. 19306172.8, filed Sep. 23, 2019. The entire contents of the above application(s) are incorporated herein by reference.

FIELD

The disclosure relates to a computer-implemented method for assisting a positioning of a digitally modeled 3D object in a 3D scene. For instance, the invention enables taking a picture of an object, such as furniture, creating a 3D model of the object, or starting from an existing image of an object, storing it and/or sharing it for further CAD operations.

BACKGROUND

Creating a digital model of a complex 3D physical object (for example, a table, made of a flat top and one or more legs) based on a single image is a complex task. Indeed, the image has a perspective, which is determined by the angle of view and the position of the camera, and, when modeling all the parts of the object, the perspective has to be taken into account. Otherwise, the 3D model would not express a realistic arrangement of the physical object. Hereafter, any reference to a 3D object will refer to a digitally modeled 3D object, and not to a physical one, unless the contrary is explicitly stated. Similarly, any reference to a 3D scene will refer to a computer-generated digital 3D scene, not to a scene in the physical world, unless the contrary is explicitly stated.

In Computer Aided Design (CAD) systems, such as the one provided by Dassault Systemes under the trademark CATIA, the user can create a complex 3D object, comprising several 3D parts, based on a single image. For that, he creates the 3D parts, by drawing the 3D parts over the 2D image (for example, by drawing a first parallelepiped over the flat top of the table, and another one for the foot plate). Alternatively, he can start from existing 3D parts. Due to the fact that the 3D parts are assembled according to only one viewpoint of the virtual camera of the CAD system, the relative positioning of the 3D parts, from that point of view, may not correspond to the desired relative positioning. For example, from a first viewpoint, the user sees that the 3D part representing the flat top of the table and the 3D part representing the table leg are aligned. From another viewpoint, both 3D parts may not be aligned.

In order to correct the wrong relative positioning of the 3D parts, the user can manipulate a graphical manipulator, such as the 3D compass in CATIA. The 3D compass embodies a compact representation of multiple functionalities which can be associated on an object on which the functionality will be exercised, for example rotation, translation, scaling.

The user drags the 3D compass towards one of the 3D parts (for example the one representing the flat top), and releases the pointer on the 3D part, which anchors the 3D compass on the 3D part. When changing the viewpoint of the virtual camera, the user translates the 3D part on which the 3D compass is anchored, by dragging one of the arrows of the 3D compass.

However, once the user changes again the viewpoint, and comes back to the initial one, it appears that the dimensions of the projection on the screen of the 3D part which has been translated have changed, due to the translation. The translated 3D part is either bigger or smaller, compared to its initial dimensions. Therefore, the user drags the 3D compass on the translated 3D part; then he presses on a scale button of the 3D compass without releasing, and moves the pointer until he considers that the 3D part has been correctly resealed.

Therefore, using the user proceeds in two steps, i.e. one for translating, another for resealing, which is time consuming. Furthermore, these two steps of may be repeated, so as to iteratively obtain the desired relative positioning, further enhancing the design time.

Solutions using the photogrammetry technique enable a very precise 3D reconstruction, as implemented for example in the application "Catia Photo To Shape" (marketed by Dassault Systemes). However this technique requires starting from at least two images, with two different viewpoints. Therefore, it is not a satisfying solution, for the modelling of a physical 3D object starting from a single image of it.

Academic research has also recently focused on 3D pose estimation, as disclosed for example in the article "3D Human Pose Machines with Self-supervised Learnong" (Keze Wang et al., IEEE Transactions on patter, analysis and machine intelligence, 2019). In that context, starting from a 2D pose of a human, it is possible to reconstruct a 3D pose, by using deep 1) learning. However, this article is specific to a certain class, i.e. human body, and cannot be extended to other class of objects. More generally, each neural network is adapted to a certain class of objects.

Therefore, there is a need for assisting the user in quickly positioning a 3D object in a 3D scene, based on a single image of the object, and which does not require a previous knowledge of the assembly.

SUMMARY

An object of the present invention is then a computer-implemented method for assisting a positioning of a digitally modeled 3D object, comprising the steps of:
S1: providing a first digitally modeled 3D object having a 3D position in a 3D scene;
S2: rendering a projection of said first digitally modeled 3D object on a screen according to a first axis and a first viewpoint;
S3: while modifying, upon user action, the 3D position of the first digitally modeled 3D object along the first axis, automatically scaling the first 3D object in order to keep constant the projection of the moved object on the screen.

In an embodiment, step S3 comprises displaying said first digitally modeled 3D object from a second viewpoint according to a second axis, said second viewpoint and said second axis being respectively different from the first viewpoint and from the first axis.

In an embodiment, the first axis and the second axis are mutually orthogonal.

In an embodiment, the first axis is represented by a dashed or continuous line, said dashed or continuous line being coincident with the first axis.

In an embodiment:
step S1 comprises providing a second digitally modeled 3D object having predetermined dimensions and a 3D position in the 3D scene;

step S3 comprises keeping fixed the 3D position and the dimensions of the second digitally modeled 3D object.

In an embodiment, step S3 comprises displaying, on the first axis, at least one snap point relative to the second digitally modeled 3D object, in order to allow fast positioning of the first digitally modeled 3D object relative to the second digitally modeled 3D object.

In an embodiment, the snap point corresponds to:
a projection, on the first axis, of the center of the minimum bounding box enclosing the second digitally modeled 3D object, or
a projection, on the first axis, of an edge of the minimum bounding box enclosing the second digitally modeled 3D object.

In an embodiment, step S3 comprises highlighting the first digitally modeled 3D object.

In an embodiment, step S1 comprises receiving a user input for at least partially fitting said first digitally modeled 3D object with a part of a 2D image on the screen.

The disclosure also relates to a computer program product, stored on a computer-readable data-storage medium, comprising computer-executable instructions to cause a computer system to carry out the aforementioned method.

The disclosure also relates to a computer-readable data-storage medium containing computer-executable instructions to cause a computer system to carry out the aforementioned method.

The disclosure also relates to a computer system comprising a processor coupled to a memory, a screen, the memory storing computer-executable instructions to cause the computer system to carry out the aforementioned method.

BRIEF DESCRIPTION OF THE DRAWINGS

Additional features and advantages of the present invention will become apparent from the subsequent description, taken in conjunction with the accompanying drawings, which show.

DETAILED DESCRIPTION

Figure 1:
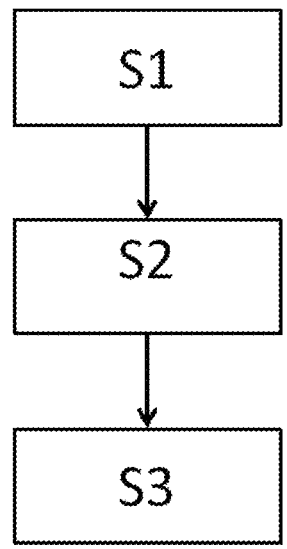
FIG. 1, a flow-chart of the method according to the invention.

In a first step of the method (step S1 of the flow chart of FIG. 1), a first (digitally modeled) 3D object OBJ1 is provided. The first object OBJ1 lies in a (computer-generated) 3D scene, according to a 3D position. It is created by the user, or it may already lie in the 3D scene before the user starts manipulating.

Figure 2:
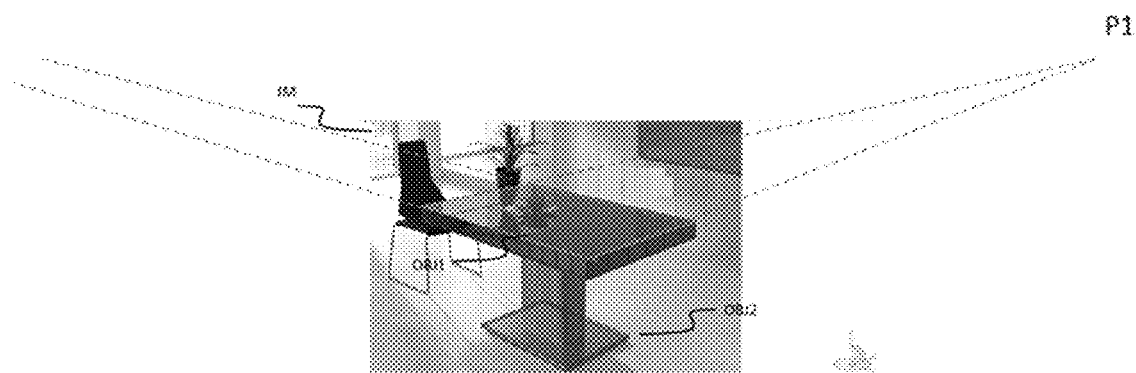
FIG. 2, an image comprising an assembly to be modeled in three dimensions, in this case the flat top of a table, and the foot plate of the table the selection of a 3D shape, according to a first viewpoint.

In a second step (step S2 of the flow chart of FIG. 1), a projection of the first 3D object OBJ1 is rendered on the screen of the electronic computing device of the user (computer, laptop, tablet, Smartphone), as illustrated by FIG. 2.

The image IM contains an assembly to be modeled in 3D. In the present case, the 2D image comprises a table made of three parts: a flat top, a plate foot and a leg on which supports the flat top, which lies on the plate foot. In the following, the correct positioning of only two 3D objects is disclosed. The positioning of other 3D objects making up the assembly is performed the same way as for two objects.

In case the user starts with a 2D image, a drawing perspective has to be detected. The inventive method is particularly suitable for images which fit Manhattan hypothesis, because the drawing perspective can easily be detected. Manhattan hypothesis is disclosed in the article "*Manhattan Word: Compass Direction from a Single Image by Bayesian Inference*" (Coughla, et al.). An image fits Manhattan hypothesis if there are three orthogonal dominant directions in the image, i.e. three main sets of parallel lines.

Then, once the right drawing perspective has been obtained, the user can draw a 3D object (also called 3D shape) on the 2D image, based on the three detected orthogonal dominant directions for images fitting Manhattan hypothesis. A user input of at least partially fitting the first 3D object OBJ1 with a part of a 2D image on the screen is received.

The drawing perspective may be detected, on the 2D image, through the identification of at least one vanishing point. A vanishing point corresponds the convergence point of two-dimensional perspective projections of mutually parallel lines in a three-dimensional space. Therefore, the drawing perspective takes the form of the vanishing point(s). One vanishing point P1 is illustrated on the right part of FIG. 2. Another one could be identified on the left part of FIG. 2, but it is not illustrated for sake of clarity.

The first 3D object OBJ1 is drawn according to the drawing perspective. In the present case, the user draws a rectangle, by dragging a pointer (mouse, finger or stylus) from a first point of the screen to another, which are defined as the opposite corners of the rectangle. Then the user makes an extrusion operation on the rectangle, in order to create a parallelepiped. The first object OBJ1 is created, which is a 3D object drawn over a 2D image. It corresponds to the flat top of the table. The same steps are implemented so as to draw the second object OBJ2. However, the method according to the invention can be implemented even for only one 3D object.

Figure 3:
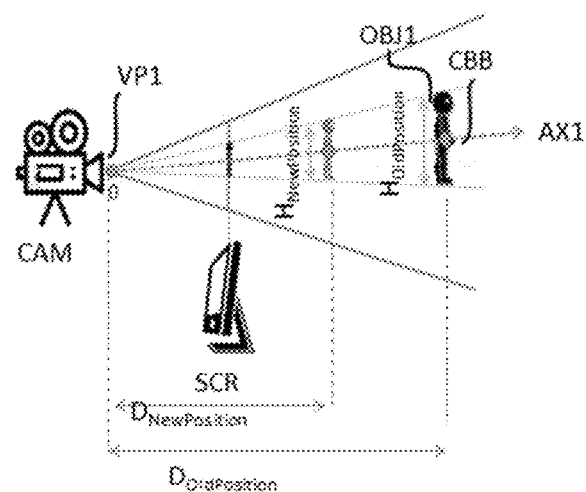
FIG. 3, a schematic illustration of the rescaling of an object.

The 3D object OBJ1 (a character in FIG. 3) is provided in a 3D scene, which is rendered by a virtual camera CAM according to a first axis AX1 and a first viewpoint VP1. The first viewpoint VP1 corresponds to the 3D position of the camera. The first axis AX1 connects the first viewpoint VP1 and the barycenter of the bounding boxes of all the 3D objects which are located in the 3D scene. On FIG. 3, it is considered that the 3D scene contains only one 3D object, i.e. the 3D object OBJ1.

Then, in a third step (step S3 of the flow chart of FIG. 1), the user drags (presses without releasing) the first object OBJ1 along the first axis AX1. While dragging the first object OBJ1 along the first axis AX1, the first object OBJ1 is rescaled, in order to keep constant the projection of the first object OBJ1 on the screen SCR.

The resealing is implemented firstly by computing the distance $D_{OldPosition}$ between the first viewpoint and the center of the minimum bounding box CBB enclosing the first object OBJ1. On FIG. 3, before manipulation of the first object OBJ1, the distance between the first viewpoint VP1, i.e. the position of the virtual camera, and the first object OBJ1, is noted $D_{OldPosition}$. When the user drags the first object OBJ1 along the first axis AX1, let note $D_{NewPosition}$ the distance between the first viewpoint VP1 and the moved first object OBJ1. Let also note $H_{OldPosition}$ one dimension of the first object OBJ1, for example its height, when the first object OBJ1 is distant from the first viewpoint VP1 by the distance $D_{OldPosition}$, and let note $H_{NewPosition}$ the same dimension, when the first object OBJ1 is distant from the first viewpoint VP1 by the distance $D_{NewPosition}$. The dimension $H_{NewPosition}$ is computed according to the following relation:

$$H_{NewPosition} = \frac{D_{NewPosition}}{D_{OldPosition}} \times H_{OldPosition}$$

Then, the first object OBJ1 is rescaled.

When the user drags the first object OBJ1 away from the first viewpoint VP1, the first object OBJ1 is enlarged, and when the user drags the first object OBJ1 closer to the first viewpoint VP1, the first object OBJ1 gets smaller. Consequently, the projection of the first object OBJ1 is kept constant, and the user does not need to manually rescale the first object OBJ1 by using the Compass.

In an embodiment, the first 3D object OBJ1 is displayed according to a second viewpoint VP2 and a second axis AX2 of the virtual camera. To this end, when the first object OBJ1 is rendered on the screen according to the first viewpoint VP1 and the first axis AX1, as illustrated in FIG. 2, the user selects (for example by clicking on a devoted button from a menu, or a contextual button) a command which triggers the displaying of the first object OBJ1 according to a second viewpoint VP2 and a second axis AX2 of the virtual camera. Therefore, the user can see the rescaling of the first object OBJ1, and he can also finely drag the first object OBJ1.

Advantageously, the first axis AX1 and the second axis AX2 are mutually orthogonal. Thus, the user can easily see the position of the first 3D object OBJ1 on the axis AX1.

Figure 4:
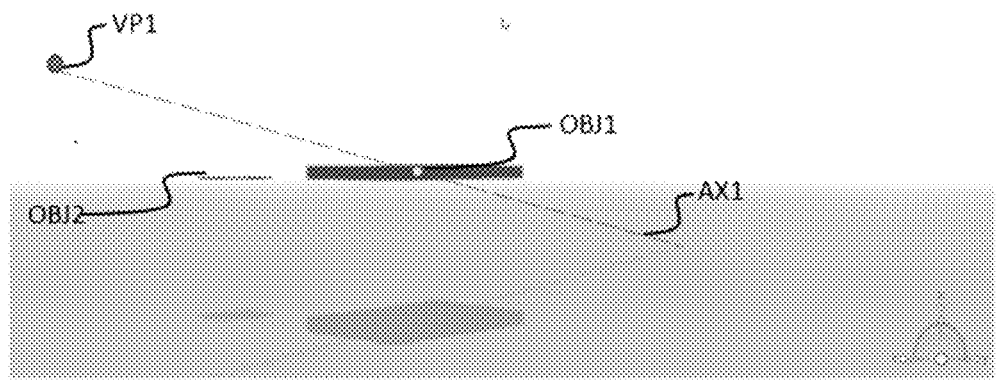
FIG. 4, the 3D scene displaying the first and second 3D objects, from a second viewpoint.
Figure 5:
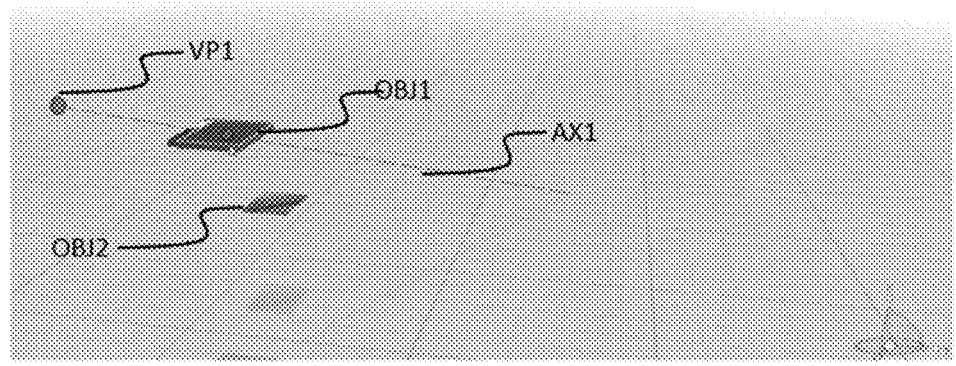
FIG. 5, an illustration of the dragging along the first axis of the virtual camera.

FIG. 4 illustrates the first 3D object OBJ1 which is displayed according to a second viewpoint VP2. On FIG. 4, it can be seen that the first object OBJ1 and the second object OB2 are not correctly aligned. Therefore, the user drags the first object OBJ1 along the first axis AX1, until he estimates that the relative positioning of both objects is correct.

In an embodiment, when the 3D scene is rendered according to the first viewpoint, the user selects the object to be moved, by clicking on it, and the moved object is highlighted. For example, the outline of the selected object blinks, or the color of the first object OBJ1 object changes once selected. If other 3D objects have been imported or drawn in the 3D scene, these objects are not highlighted. Thus, even if the object to be moved is partially hidden by other objects in the 3D scene, the user can easily identify it in the 3D scene.

The first axis AX1 is advantageously represented by a dashed or continuous line which is coincident with the first axis AX1. Therefore, the displacement of the first 3D object OBJ1 can be easily predicted when the user modifies the position of the first 3D object OBJ1. Without the dashed or continuous line, it would be difficult for the user to evaluate the position of the first viewpoint compared to the second viewpoint, in particular when the first axis AX1 and the second axis AX2 are not orthogonal. It would also be difficult to evaluate the precise orientation of the first axis AX1 relative to the second axis AX2. This embodiment is also useful when the second axis AX2 cannot be orthogonal with the first axis AX1 due to a 3D object hiding the second viewpoint VP2. This may happen when the 3D scene contains a lot of 3D objects.

FIG. 4 illustrates the displacement of the first object OB1 along the first axis AX1. The first object OBJ1 is now closer from the first viewpoint VP1, so the first object OBJ1 gets smaller. Thus, the projection of the first object OBJ1 on the screen, when the camera is located at the first viewpoint V1, is kept constant.

In an embodiment, when at least a first and a second 3D objects have to be positioned one relatively to the other, step S3 comprises displaying, on the first axis, at least one snap point SP relative to the second 3D object OBJ2. Hereafter, a snap point is a graphical icon which is positioned on the first axis AX1, at a location which corresponds to the projection of a characteristic point of the second 3D object OBJ2 on the first axis AX1. Therefore, the movement of the first 3D object OBJ1 on the snap point SP is not as fast as on the other parts of the first axis AX1, so that the user can make a very fine and precise alignment of the first 3D object OBJ1 relative to the second 3D. For example, when dragging the first 3D object OBJ1, hovering the pointer over the snap point may be slower than on the other parts of the first axis AX1. Alternatively, the first object may be anchored to the snap point SP when hovering over it (without, however, totally preventing the user to move the first 3D object OBJ1).

Advantageously, the snap point may correspond to:
  a projection, on the first axis AX1, of the center of the minimum bounding box enclosing the second 3D object OBJ2, or
  a projection, on the first axis, of an edge of the minimum bounding box enclosing the second 3D object OBJ2.

Figure 6:
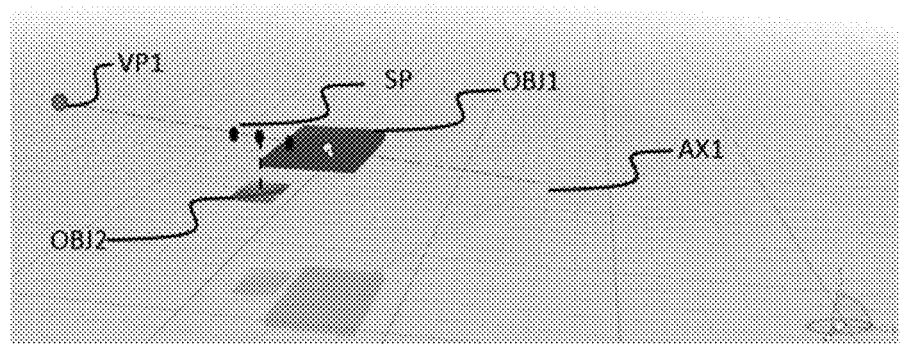
FIG. 6, an illustration of the snap points.

Several snap points of the same object may be displayed on the first axis AX1, as illustrated by FIG. 6. Therefore, the user can choose to align the first 3D object with either the center of the minimum bounding box enclosing the second 3D object OBJ2, or with one of the edges of the bounding box. The type of snap points is configurable.

Figure 7:
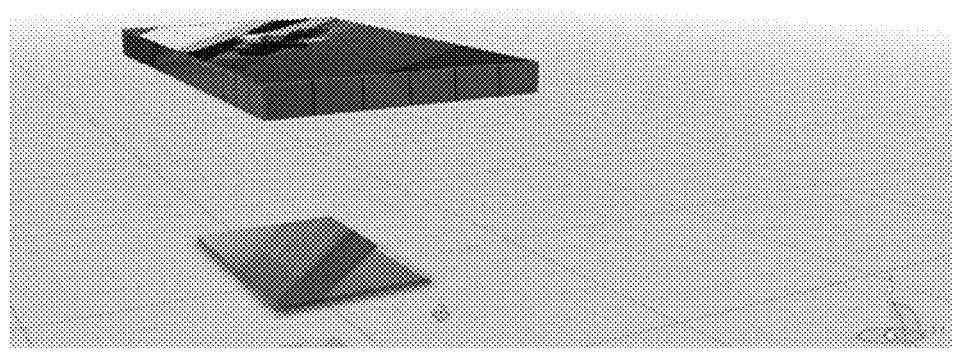
FIG. 7, the 3D assembly comprising the corrected positions of the 3D objects.

The user can navigate in the 3D scene, so as to check that the first 3D object OBJ1 is positioned as expected, by using, for example, a combination of moving the mouse while pressing the middle button of the mouse. For example, he can position again the virtual camera according to the first viewpoint, as illustrated by FIG. 7.

At any moment, he can also switch to the 2D image as illustrated by FIG. 2, by clicking (press and release) in the 3D scene, outside the 3D objects. Thus, he can check that the dimensions of 3D objects remain constant.

In another embodiment, the 3D scene according to another viewpoint of the camera may be displayed in a thumbnail view, while displaying, in the main part of the screen, the 2D image. Therefore, the user can see that it is necessary to move and realign one of the 3D objects.

The inventive method can be performed by a suitably-programmed general-purpose computer or computer system, possibly including a computer network, storing a suitable program in non-volatile form on a computer-readable medium such as a hard disk, a solid state disk or a CD-ROM and executing said program using its microprocessor(s) and memory.

Figure 8:
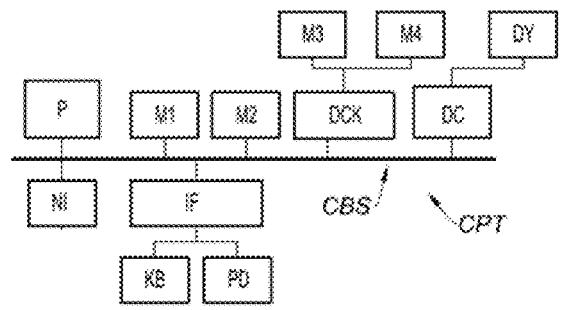
FIG. 8, the block diagram of a computer system suitable for carrying out a method according to the invention.

A computer CPT suitable for carrying out a method according to an exemplary embodiment is described with reference to FIG. 8. In FIG. 8, the computer CPT includes a Central Processing Unit (CPU) P which performs the method step described above while running an executable program, i.e. a set of computer-readable instructions, stored in a memory device such as RAM M1 or ROM M2 or hard disk drive (HDD) M3, DVD/CD drive M4, or stored remotely. Moreover, the 3D objects created in step S1 of the method may also be stored on one or more of memory devices M1 to M4, or remotely.

The claimed invention is not limited by the form of the computer-readable media on which the computer-readable instructions and/or the data structure of the inventive process are stored. For example, the instructions) and files can be stored on CDs, DVDs, in FLASH memory, RAM, ROM, PROM, EPROM, EEPROM, hard disk or any other information processing device with which the computer communicates, such as a server or computer. The program and the files can be stored on a same memory device or on different memory devices.

Further, a computer program suitable for carrying out the inventive method can be provided as a utility application, background daemon, or component of an operating system, or combination thereof, executing in conjunction with CPU P and an operating system such as Microsoft VISTA, Microsoft Windows 10, UNIX, Solaris, LINUX, Apple MAC-OS and other systems known to those skilled in the art.

CPU P can be a Xenon processor from Intel of America or an Opteron processor from AMD of America, or can be other processor types, such as a Freescale ColdFire, IMX, or ARM processor from Freescale Corporation of America. Alternatively, the CPU can be a processor such as a Core2 Duo from Intel Corporation of America, or can be implemented on an FPGA, ASIC, PLD or using discrete logic circuits, as one of ordinary skill in the art would recognize. Further, the CPU can be implemented as multiple processors cooperatively working to perform the computer-readable instructions of the inventive processes described above.

The computer CPT in FIG. 8 also includes a network interface NI, such as an Intel Ethernet PRO network interface card from Intel Corporation of America, for interfacing with a network, such as a local area network (LAN), wide area network (WAN), the Internet and the like. The computer further includes a display controller DC, such as a NVIDIA GeForce GTX graphics adaptor from NVIDIA Corporation of America for interfacing with display DY, such as a Hewlett Packard HPL2445w LCD monitor. A general purpose I/O interface IF interfaces with a keyboard KB and pointing device PD, such as a roller ball, mouse, touchpad and the like. The display, the keyboard and the pointing device, together with the display controller and the I/O interfaces, form a graphical user interface, used by the user to provide input commands and by the computer for displaying the 3D objects.

Disk controller DKC connects HDD M3 and DVD/CD M4 with communication bus CBS, which can be an ISA, EISA, VESA, PCI, or similar, for interconnecting all of the components of the computer.

A description of the general features and functionality of the display, keyboard, pointing device, as well as the display controller, disk controller, network interface and I/O interface is omitted herein for brevity as these features are known.

Any method steps described herein should be understood as representing modules, segments, or portions of code which include one or more executable instructions for implementing specific logical functions or steps in the process, and alternate implementations are included within the scope of the exemplary embodiment of the present invention.

The invention claimed is:

1. A computer-implemented method for assisting a positioning of a digitally modeled 3D object, comprising:
   obtaining a first digitally modeled 3D object having a 3D position in a 3D scene;
   rendering a projection of said first digitally modeled 3D object on a screen according to a first axis and a first viewpoint;
   upon reception of a user command, switching from the first viewpoint to a second viewpoint according to a second axis, said second viewpoint and said second axis being respectively different from the first viewpoint and from the first axis, the first axis and the second axis being mutually orthogonal;
   automatically scaling, while modifying, upon dragging a pointing element on said projection of the first digitally modeled 3D object on the screen, a 3D position of the first digitally modeled 3D object along the first axis, the first 3D object in order to keep constant the projection of a moved object on the screen according to the first viewpoint,
   wherein the automatically scaling further includes displaying said first digitally modeled 3D object from the second viewpoint; and
   upon reception of a user command, switching from the second viewpoint to the first viewpoint.

2. The computer-implemented method of claim 1, wherein the automatically scaling further includes highlighting the first digitally modeled 3D object.

3. The computer-implemented method of claim 1, wherein the obtaining further includes receiving a user input for at least partially fitting said first digitally modeled 3D object with a part of a 2D image on the screen.

4. The computer-implemented method of claim 1, wherein the first axis is represented by a dashed or continuous line, said dashed or continuous line being coincident with the first axis.

5. The computer-implemented method of claim 1, wherein:
   the obtaining further includes obtaining a second digitally modeled 3D object having predetermined dimensions and a 3D position in the 3D scene; and
   the automatically scaling further includes keeping fixed the 3D position and the dimensions of the second digitally modeled 3D object.

6. The computer-implemented method of claim 5, wherein the automatically scaling further includes displaying, on the first axis, at least one snap point relative to the second digitally modeled 3D object, in order to allow fast positioning of the first digitally modeled 3D object relative to the second digitally modeled 3D object.

7. The computer-implemented method of claim 6, wherein said snap point corresponds to:
   a projection, on the first axis, of the center of the minimum bounding box enclosing the second digitally modeled 3D object, or
   a projection, on the first axis, of an edge of the minimum bounding box enclosing the second digitally modeled 3D object.

8. A non-transitory computer readable medium having stored thereon computer-executable instructions that when executed cause a computer system to implement a method for assisting a positioning of a digitally modeled 3D object comprising:
   obtaining a first digitally modeled 3D object having a 3D position in a 3D scene;

rendering a projection of said first digitally modeled 3D object on a screen according to a first axis and a first viewpoint;

upon reception of a user command, switching from the first viewpoint to a second viewpoint according to a second axis, said second viewpoint and said second axis being respectively different from the first viewpoint and from the first axis, the first axis and the second axis being mutually orthogonal;

automatically scaling, while modifying, upon dragging a pointing element on said projection of the first digitally modeled 3D object on the screen, a 3D position of the first digitally modeled 3D object along the first axis, the first 3D object in order to keep constant the projection of a moved object on the screen according to the first viewpoint, wherein the automatically scaling further includes displaying said first digitally modeled 3D object from the second viewpoint; and upon reception of a user command, switching from the second viewpoint to the first viewpoint.

9. A computer system, comprising:

a processor coupled to a memory, a screen, the memory storing computer-executable instructions that when executed by the processor causes the processor to be configured to:

obtain a first digitally modeled 3D object having a 3D position in a 3D scene, render a projection of said first digitally modeled 3D object on a screen according to a first axis and a first viewpoint, upon reception of a user command, switching from the first viewpoint to a second viewpoint according to a second axis, said second viewpoint and said second axis being respectively different from the first viewpoint and from the first axis, the first axis and the second axis being mutually orthogonal;

automatically scale, while modifying, upon dragging a pointing element on said projection of the first digitally modeled 3D object on the screen, a 3D position of the first digitally modeled 3D object along the first axis, the first 3D object in order to keep constant the projection of a moved object on the screen according to the first viewpoint, wherein automatically scale further includes displaying said first digitally modeled 3D object from the second viewpoint; and upon reception of a user command, switching from the second viewpoint to the first viewpoint.

10. The computer system of claim 9, wherein the first axis is represented by a dashed or continuous line, said dashed or continuous line being coincident with the first axis.

11. The computer system of claim 9, wherein the processor is further configured to obtain by being further configured to obtain a second digitally modeled 3D object having predetermined dimensions and a 3D position in the 3D scene, and wherein the processor is further configured to automatically scale by being further configured to keep fixed the 3D position and the dimensions of the second digitally modeled 3D object.

12. The computer system of claim 11, wherein the processor is further configured to automatically scale by being further configured to display, on the first axis, at least one snap point relative to the second digitally modeled 3D object, in order to allow fast positioning of the first digitally modeled 3D object relative to the second digitally modeled 3D object.

13. The computer system of claim 12, wherein said snap point corresponds to:

a projection, on the first axis, of the center of the minimum bounding box enclosing the second digitally modeled 3D object, or a projection, on the first axis, of an edge of the minimum bounding box enclosing the second digitally modeled 3D object.

14. The computer system of claim 9, wherein the processor is further configured to automatically scale by being further configured to highlight the first digitally modeled 3D object.

15. The computer system of claim 9, wherein the processor is further configured to obtain by being further configured to receive a user input for at least partially fitting said first digitally modeled 3D object with a part of a 2D image on the screen.

* * * * *